Figure 1:
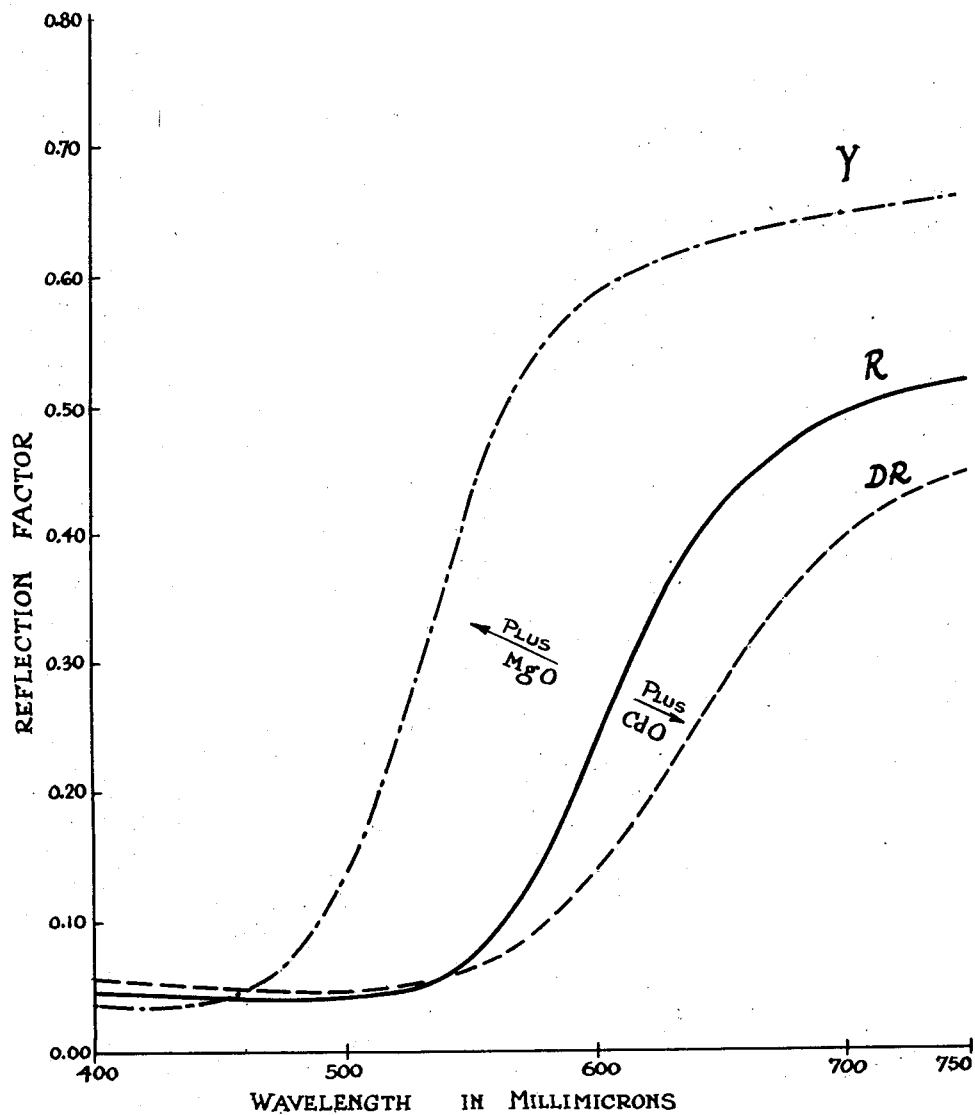

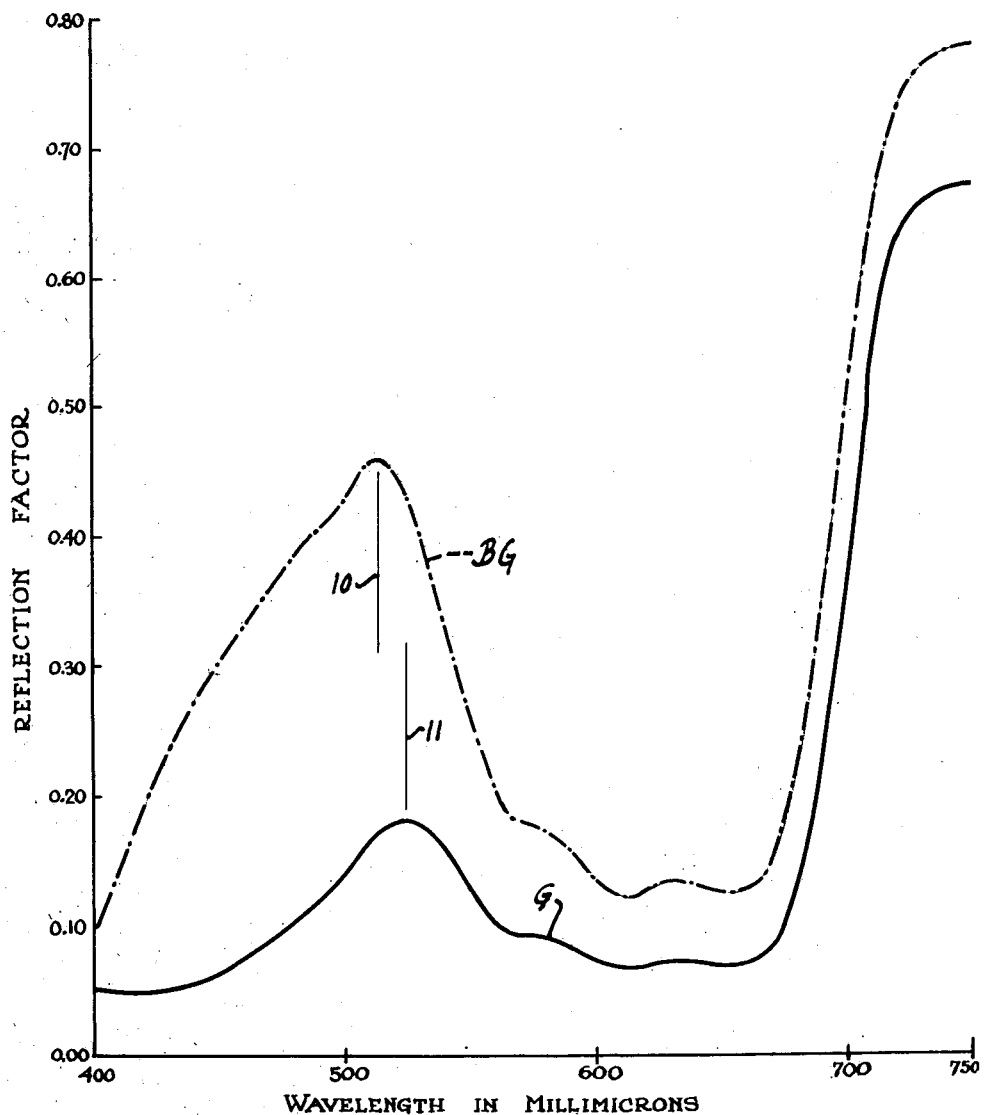

Patented Dec. 18, 1951

2,579,020

UNITED STATES PATENT OFFICE 2,579,020

COLOR SHIFTING AGENTS AND METHOD OF USING SAME

Frederick Gordon Smith, Toronto, Ontario, Canada

Application February 27, 1948, Serial No. 11,488

14 Claims. (Cl. 106—288)

This invention relates to color shifting agents for zinc oxide pigments and method of preparation of color shifted pigments.

This is a continuation-in-part application of my application Serial No. 606,707, filed July 23, 1945, now abandoned.

Prior pigments are comprised of a neutral or colorless material forming a base or matrix which incorporates or has added thereto, a coloring medium or material. Zinc oxide, magnesium oxide and silicon dioxide appear to be the most common matric materials and nowhere is it suggested that these materials act as other than neutral substances which give body to the pigments and also serve to dilute the coloring effect of the coloring medium or mediums.

The color of a pigment may be modified according to prior teaching by changing the degree of fineness of the grind, but in such instance, the color of the pigment is basically the same in the particular series. Thus, an orange pigment comprised of 99% zinc oxide and 1% manganese oxide may be altered toward yellow by increasing the fineness of the grind. According to prior knowledge, magnesium oxide is recognized only as a neutral white body material since nowhere is it described as acting in any other capacity. Its action solely as a white body material appears to have been taken for granted and is an accepted fact in the art.

The manufacturer of pigments must in many instances combine two pigments of a different color in order to obtain a color between the two pigments. For instance, it is necessary to prepare blue-greens in this manner by mixing a green pigment and a blue-violet pigment in proper proportion. When the spectral reflection curve of the final color or pigment mixture is compared with the spectral reflection curves of the original pigments, it will be found that the curve of the final color extends over the full wave length range of the two original colors on the wave length base and that the dominant color derived from a hump on the curve is modified in its effect by other humps being the modified remaining spectral reflection peaks of the original pigment curves. It is admitted that by careful selection, a purely mechanical mixture of two pigments can result in a final color mixture which has good "color density," but in many instances mixtures of pigments result in muddy colors where the spectral response curve has only a gentle hump rather than a definite peak.

In order that a compound may exhibit a color it must be transparent and selectively absorb some of the wave lengths of light passing through it. Among the inorganic colored compounds there are two types of such selective absorption. One is the absorption on the long wave length side of the principal absorption band. As this band is made to move into the visible range, it appears first in the violet side of the spectrum and may be made to move from the violet end to the red end by making the compound more metallic in nature. The other type of absorption is that due to impurities or atomic groupings which form an absorption band on the long wave length side of the principal absorption band. Such absorption bands are narrower than the principal absorption band and may absorb a small range of wave lengths and allow transmission of wavelengths both longer and shorter than this range.

In accordance with the present invention particular regard is had to the impurity type of absorption band and in this connection, I modify, change or shift the color absorption characteristics of a pigment by changing the inter-atomic spacings and/or electronic configurations around constituent atoms. In the practical sense, however, the only material to which I have so far applied this new theory is zinc oxide in the form of a solid solution and which includes a coloring material. I have tried titanium oxides and other metal oxides as a colorless material to which a coloring material has been added in a solid solution without apparent success. It is peculiar that zinc oxide affords the only material so far discovered or practically contemplated as a material subject to the mechanisms of the invention taught herein.

Although it is reasonable to assume that any element could enter into a zinc oxide structure which includes a coloring material in solid solution, only certain elements have given any appreciable result or shifting effect which is apparent to the human eye. Thus, in accordance with the invention the zinc oxide and coloring material mixture in the form of a solid solution is subjected to the influence of what I term herein a color shifting agent which acts to shift the color response curve or the absorption band due to the impurity or coloring material in the pigment. The color shifting agent, however, so far as is known, only enters the zinc positions of the atomic structure and only a certain limited group of elements appear to give results which are useful to any degree for pigment purposes.

The understanding of the mechanisms involved in employing a color shifting agent in conjunction with a conventional zinc oxide type pigment to provide a color shift requires an appreciation of the structure identified by the phrase "solid solution." Reference should, therefore, be made to "Introduction to Crystal Chemistry," R. C. Evans, Cambridge University Press 1939, chapt. 5, Alloy Systems, and chapters 6 and 7.

Briefly, when pure zinc oxide, or any compound of zinc which decomposes the zinc oxide on heating, is heated to a very high temperature, it crystallizes to small, transparent, uncolored hexagonal crystals. This is well-known in the art. Zinc oxide has the property of holding a relatively large amount of many elements other than zinc in stable solid solution and in this respect, is different from other materials such as titanium or other body materials ordinarily used in pigments. It is this property which makes zinc adaptable in the practical sense to the method of color shifting according to the present invention.

The most convenient method for dissolving such elements in zinc oxide is to heat amorphous zinc oxide mixed with a small amount of another metallic oxide (coloring material) to a high temperature in well-known manner to crystallize the zinc oxide and at the same time incorporate the impurity oxide within the crystal structure of the zinc oxide. Thus, cobalt will confer a saturated green color to zinc oxide and manganese a somewhat less saturated orange color. In accordance with the invention, however, the inclusion of a further constituent, that is to say, a color shifting agent in solid solution will shift the color so that a new color will be obtained different from that expected to be derived according to prior teachings.

Although as previously described, it is feasible that in the theoretical sense any element might act as a color shifting agent, in the practical sense I have found only two which are commercially satisfactory but which are satisfactory to a high degree. Further, it is fortunate that one material will serve to shift the color response of a pigment of the type described toward the violet end of the spectrum whereas the other preferred agent found shifts toward the red end of the spectrum and in either case, the amount of color shift is proportional to the amount of shifting agent ingredient held in solid solution.

Thus I have found that magnesium oxide in solid solution accomplishes a shift of the ordinarily expected color of the zinc oxide body and coloring material to a new place on the wave length base of the spectral response curve without effecting any substantial alteration in the form of the curve but shifting the same toward the violet end of the spectrum. Cadmium oxide in solid solution effects a shift toward the red end of the spectrum.

Materials which will given an appreciable color shift which is apparent to the human eye are found in group IIB of the periodic table but mercury and radium are not practical for use and are excepted. These materials in this group are of a colorless type and I employ them in the oxide form.

I have also found that of the colored type of materials which also have a color shifting property to a degree which may be apparent to the human eye, that iron, nickel and others of group VIII of the period table may be selected from. It is particularly recommended, however, that colored shifting agents be avoided since it is most difficult to predict the results which may be obtained and in any case my experiments have shown that the best results can be obtained from the shifting agents of the non-colored type. For other reasons such as considerations of chemical activity, permanency and other factors, I prefer to use and recommend magnesium oxide and cadmium oxide as color shifting agents and which are of the colorless type.

To illustrate precisely what occurs and to demonstrate the usefulness of a color shifting agent, reference shall be made to the accompanying drawings wherein:

Figure 1 is the reflection factor versus wave length in millimicrons obtained by spectrophotometric tests for the visible region excluding specular reflection, these curves being traced from actual curves obtained by test and showing the shifting of a red pigment of the zinc oxide type, toward the violet end of the spectrum by the use of one color shifting agent and toward the red end of the spectrum by the use of a different color shifting agent.

Figure 2 is a similar representation of the spectral reflection factor curves for a green pigment which is shifted to a blue-green by the use of a color shifting agent.

Referring to the drawings:

Figure 1 shows the spectral reflection curve in bold line for a red pigment comprised of 15% manganese oxide with the remainder zinc oxide. The curve Y is the spectral response curve of a new pigment formed by using magnesium oxide as a color shifting agent up to a value of approximately 20%, the color being yellow. The curve DR is the spectral reflection curve of a pigment formed by using cadmium oxide in the concentration of 30% by weight, the color being dark red-violet. It will be noticed that magnesium oxide shifts the color toward the violet end of the spectrum whereas cadmium oxide shifts the color toward the red end of the spectrum. In both instances, the form of the curve R is substantially preserved, although it will be noted that the magnitude of the reflection value may be modified with an increase attendant in the use of magnesium oxide.

In Figure 2, a green pigment represented by the curve G in bold line made from a zinc oxide and cobalt oxide has been shifted by using the color shifting agent magnesium oxide to give the curve BG. The pigment G is green whereas the resulting color in the shifted pigment BG is blue-green. The lines 10 and 11 placed on this figure illustrate the degree of shift accomplished. The form of the curve G again has not been substantially altered when subjected to the shifting mechanism since the curve BG simulates the various humps and indentations of the original curve G. It will be noted however, that the spectral reflection value has been increased as compared with the peaks found in the original curve G. The blue-green obtained is extremely clear and brilliant to the human eye as compared with blue-greens prepared by prior art methods.

Although I have illustrated the simple shifting of the spectral response curve of a pigment by using a single color shifting agent, it will be apparent that the operations may be multiplied, where for instance, double color shift is attempted. Thus, using an orange pigment of zinc oxide type having 1% MnO and a green pigment comprised of ½% CoO with ZnO, the first pigment may be shifted to light yellow by using 10% MgO and the second may be shifted to bluish-green using the same percentage of this color shifting agent. This would be a single color shift for each pigment. Now if an olive-geen pigment is made up of MgO and CoO in the same percentages, a double color shift may be accomplished by using 10% MgO as a color shifting agent. It will be found that the resulting color will be a willow green.

The following table lists the percentages of color shifting agents by weight, which may be used to obtain the listed color shift in a zinc oxide pigment, the amount of zinc oxide not being shown but understood to comprise the remainder of the pigment:

| Color | Coloring Metallic Oxide (Approximate Percentages) | | | Color Shifting Agent (Approximate Percentages) | |
|---|---|---|---|---|---|
| | CoO | MnO | | MgO | CdO |
| Red | | 15 | | | |
| Violet | | 10 | (shifted red) | | 30 |
| Orange | | 5 | | | |
| Red | | 2 | (shifted orange) | | 5 |
| Chrome-Yellow | | 1 | | | |
| Lemon-Yellow | | 1 | (Shifted chrome-yellow) | 20 | |
| Willow Green | ½ | 1 | (double shift using CoO) | 10 | |
| Green | 1 | ½ | | | |
| Blue-Green | 1 | ½ | (shifted green) | 20 | |

To prepare the colors between green and yellow I prefer to use both cobalt and manganese with the color shifting agent magnesium oxide as shown in the previous table. Also the inclusion of a small amount of manganese oxide along with the cobalt oxide gives a color closer to a true green than the color due to cobalt alone. As mentioned previously, the inclusion of manganese gives a yellow-orange color. I have found that the addition of cadmium oxide as a color shifting agent along with the manganese gives more saturated colors in the orange to red range, than those previously obtainable with manganese alone. The addition of magnesium moves the yellow color due to manganese in the other direction toward the violet end of the visible spectrum, the limiting color being a saturated lemon-yellow when the maximum amount of magnesium oxide is in solid solution.

The apparent advantages of the color shifted colored zinc oxide for pigment purposes are the following: (1) A complete range of colors from blue-green to orange-red, where any one color is composed of only one compound and not a mixture of compounds, is provided; (2) All of the pigments are stable chemically and will withstand a very high temperature; (3) The color of the pigments is permanent under normal conditions of weathering; (4) The pigments, over the entire range, transmit and refract the near infra-red radiation so that paints prepared from them have a high infra-red reflectance, making them of use for purposes such as simulating vegetation for camouflage.

There are limits to the concentration of either cadmium oxide or magnesium oxide where such may serve in the capacity of color shifting agents. Thus, in a pigment comprised of 98% zinc oxide and 2% cobalt oxide, the green color may be shifted progressively toward blue-green by the addition of magnesium oxide up to about 20% by weight. After this point has been reached some pink crystals of cubic magnesium oxide will be colored by the cobalt oxide, resulting in a purplish-pink additional pigment, the particles of which are of a color well-known by the term "cobalt pink." Thus, if the shifting mechanism is extended beyond practical limits the color obtained will begin to grey off toward a greyish blue-green in the present example. I specify therefore, that the limits defining the addition of a color shifting agent to a zinc oxide pigment is in each case the limit of solid solution of the color shifting agent in hexagonal zinc oxide at the temperature of firing. In applying the method of shifting a color response curve of a pigment according to the invention as taught herein, conventional and well-known practice was utilized in the combining of the ingredients including the selection of temperature of firing. Obviously, the temperature of firing will vary widely as is well-known for different pigments but no departure from well-known practice in this regard is contemplated. Obviously, the limits of the addition of either magnesium oxide or cadmium oxide is determined to a degree by the temperature of firing and the time period of firing at the chosen temperature. These factors are dictated more by commercial requirements than the effects produced in the final pigment as is well-known. At a temperature of 1200° C., safe maximums are 20% for magnesium oxide and 30% for cadmium oxide, by weight of the compound.

I propose to use the shifted zinc oxide pigments described above in paints in an oil vehicle for decorative and artistic purposes in so-called water colors for artistic purposes, in a water vehicle for decorative purposes, in plastic and other vehicles for coloring purposes, and as the coloring medium in decorated ceramic articles.

What I claim as my invention is:

1. A method of shifting the spectral response curve of a green pigment composed of zinc oxide crystallized in the hexagonal system and having colouring materials of cobalt oxide present in the order of about 1% by weight of the compound and manganese oxide present in the order of about ½% by weight of the compound, contained within the crystal structure of the latter; and comprising the steps in combination of heating said compound to about 1200 degrees centigrade and adding a color shifting agent of magnesium oxide in a concentration of about 20% by weight of the compound to absorb the same in solid solution within the crystal structure of said pigment to provide a colour shift in the original pigment from green to blue-green.

2. In a pigment compound which includes a base mixture of zinc oxide crystallized in the hexagonal system and a composite colouring material of cobalt oxide present in a concentration of about 1% by weight of the compound and manganese oxide present in a concentration of about ½% by weight of the compound, contained within the crystal structure of the compound in the form of a true solid solution; the combination therewith of a color shifting agent of magnesium oxide, the said magnesium oxide providing a shifting of the original colour of the zinc oxide and cobalt oxide mixture to a blue-green when the amount of magnesium oxide is large and in a concentration of about 20% by weight of the compound, the said original colour being green, and colours intermediate between green and blue-green for lesser amounts of magnesium oxide.

3. In a pigment compound composed of a base mixture of zinc oxide crystallized in the hexagonal system and a composite colouring material comprised of both manganese oxide and cobalt oxide, in the form of a true solid solution contained within the crystal structure of the compound and having a colour series extending from green, when the cobalt oxide is in a concentration of about 1% by weight of the compound and the manganese oxide in a concentration of about ½% by weight of the compound, to orange, when the cobalt oxide is present in a concentration of about ½% by weight of the compound and the manganese oxide is present in a concentration of about 10% by weight of the compound; the combination therewith of a color shifting agent of magnesium oxide present in a concentration up to about 20% by weight of the compound, the final colour of the compound including the color shifting agent being yellow-orange when the ratio of the amount to cobalt oxide of manganese oxide is small and the amount of magnesium oxide is small, the colour of the compound being blue-green when the ratio of the amount of cobalt oxide to manganese oxide is large and the amount of magnesium oxide is about 20% by weight of the compound, and intermediate colours such as green, yellow-green, lemon-yellow, and yellow, when the ratio of the amount of cobalt to manganese is between the said limits and the amount of magnesium is less that 20% by weight of the compound but not zero.

4. A method of forming a different coloured pigment from a zinc oxide pigment having a colouring metal oxide within the crystal structure of the zinc oxide in solid solution and wherein the different coloured pigment to be formed possesses a colour saturation substantially the same or greater than that of the zinc oxide-colouring metal pigment, and comprising the steps in combination of: mechanically mixing with the zinc oxide-colouring metal pigment 2% to about 30% by weight of a colourless colour shifting agent in finely divided form selected from the group consisting of the oxides of magnesium and cadmium, heating the mixture to about 1200° centigrade to cause the colour shifting agent to enter the zinc positions of the atomic structure of the zinc oxide and to enter into solid solution therewith.

5. A pigment comprising in combination: zinc oxide, a colouring metal oxide disposed in solid solution within the crystal structure of the zinc oxide, and a colourless colour shifting agent selected from the group consisting of magnesium oxide and cadmium oxide present in an amount of between 2% and about 30% by weight of the zinc oxide and colouring metal in solid solution in said pigment.

6. A pigment comprising in combination zinc oxide, a coloring metal oxide selected from the group consisting of cobalt oxide, manganese oxide, and mixtures of cobalt oxide and manganese oxide, disposed in solid solution within the crystal structure of the zinc oxide, and a colorless color shifting agent selected from the group consisting of magnesium oxide and cadmium oxide present in an amount of between 2% and about 30% by weight of the zinc oxide and coloring metal oxide in solid solution in said pigment.

7. A zinc oxide pigment in accordance with claim 6, in which the coloring metal oxide is cobalt oxide.

8. A zinc oxide pigment in accordance with claim 7 in which the color shifting agent is magnesium oxide in an amount from about 2 to about 20% by weight.

9. A zinc oxide pigment in accordance with claim 7 in which the color shifting agent is cadmium oxide in an amount from about 2 to about 30% by weight.

10. A zinc oxide pigment in accordance with claim 6 in which the coloring metal oxide is manganese oxide.

11. A zinc oxide pigment in accordance with claim 10 in which the color shifting agent is magnesium oxide in an amount from about 2 to about 20% by weight.

12. A zinc oxide pigment in accordance with claim 10 in which the color shifting agent is cadmium oxide in an amount from about 2 to about 30% by weight.

13. A zinc oxide pigment in accordance with claim 6 in which the coloring metal oxide is a mixture of manganese oxide and cobalt oxide.

14. A zinc oxide pigment in accordance with claim 13 in which the color shifting agent is magnesium oxide in an amount from about 2 to about 20% by weight.

FREDERICK GORDON SMITH.

REFERENCES CITED

The following references are of record in the file of this patent:

UNITED STATES PATENTS

| Number | Name | Date |
|---|---|---|
| 2,028,980 | Korinth et al. | Jan. 28, 1936 |
| 2,068,294 | Korinth et al. | Jan. 19, 1937 |

FOREIGN PATENTS

| Number | Country | Date |
|---|---|---|
| 731,280 | France | Aug. 31, 1932 |

OTHER REFERENCES

Handbook of Chemistry and Physics, 22nd ed., Chemical Rubber Pub. Co., Cleveland, Ohio, 1937, pg. 366, Nos. 4 and 5; pg. 408, No. 10.